Figure 1:
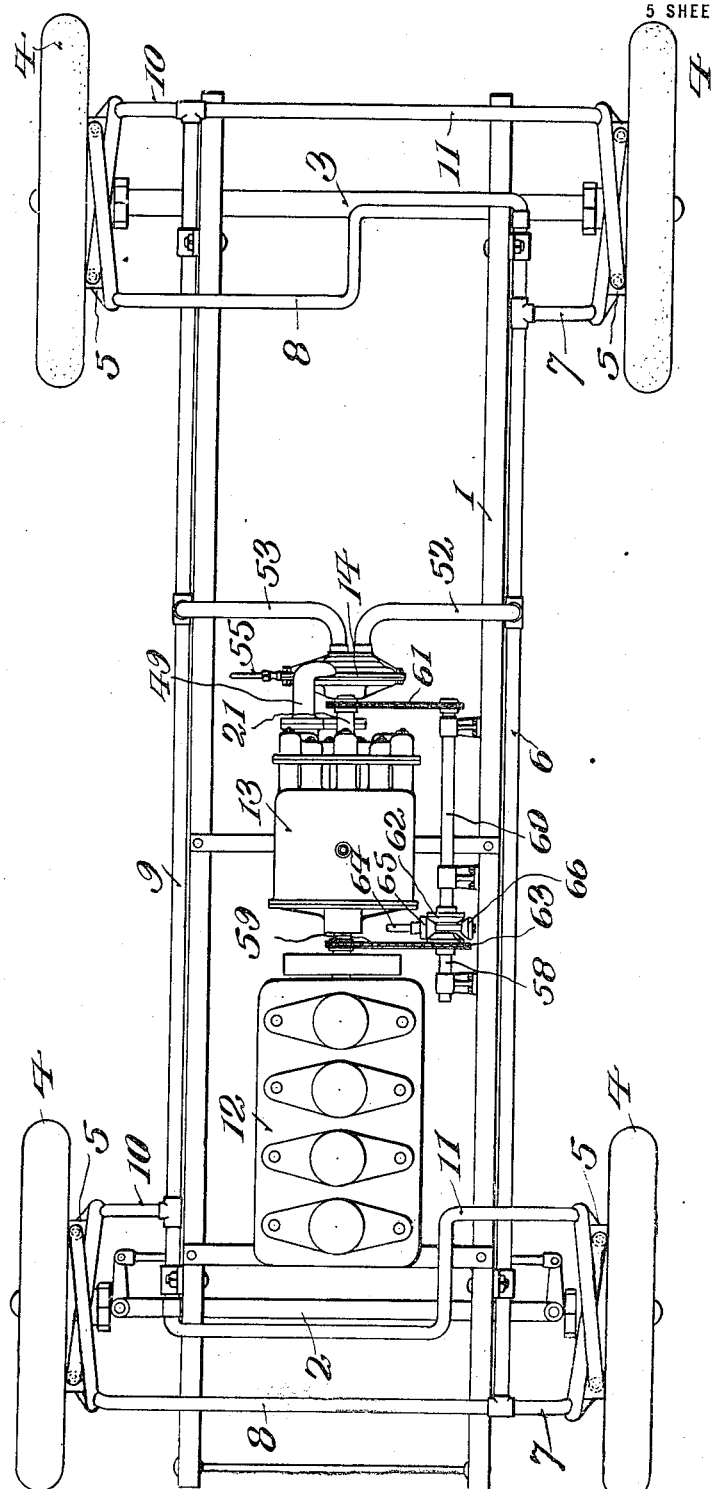

H. N. NORTON.
FLUID POWER TRANSMITTING APPARATUS FOR VEHICLES.
APPLICATION FILED OCT. 28, 1913.

1,157,415.

Patented Oct. 19, 1915.
5 SHEETS—SHEET 1.

Witnesses

Inventor
Horatio N. Norton
By Sturtevant & Mason
Attorneys

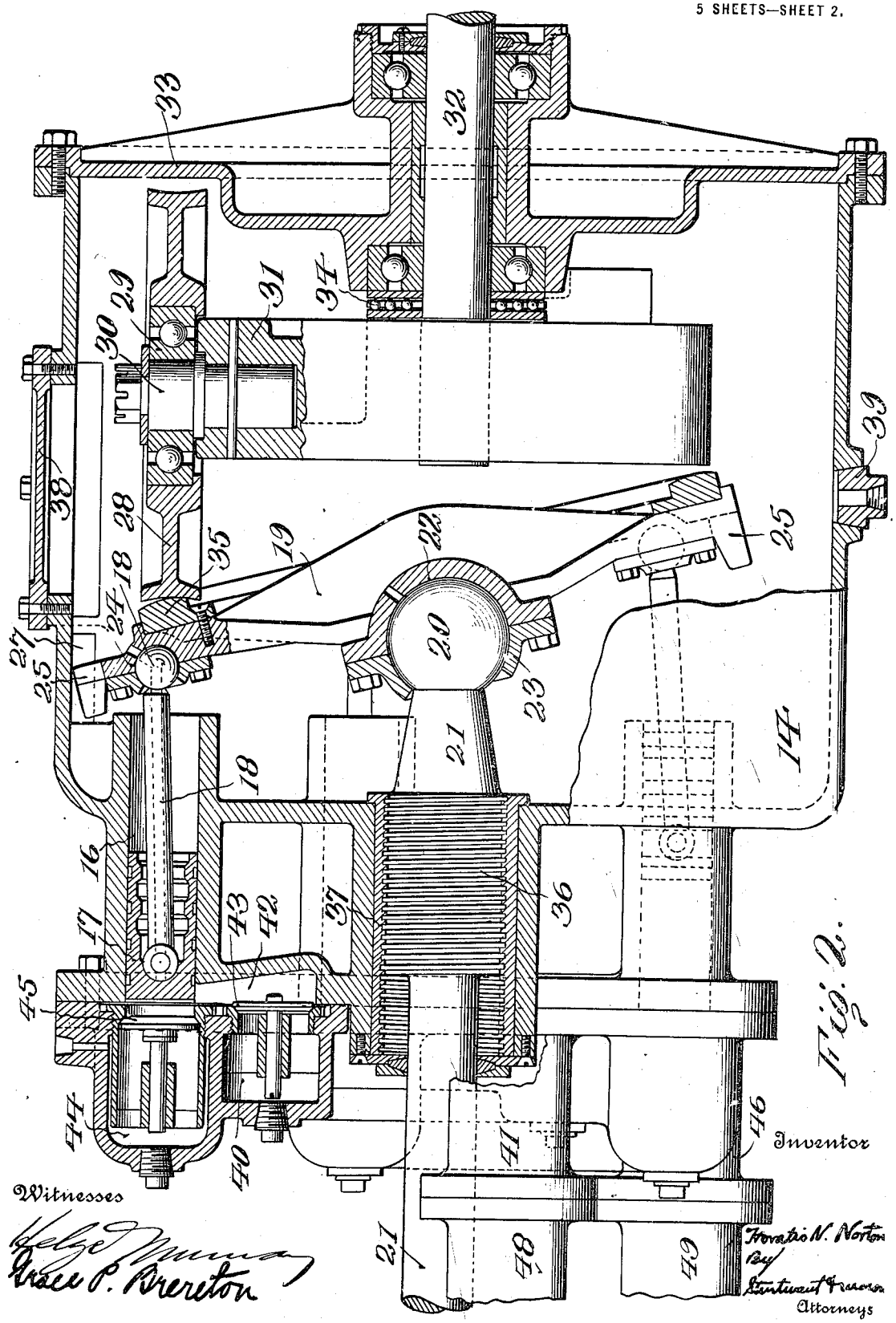

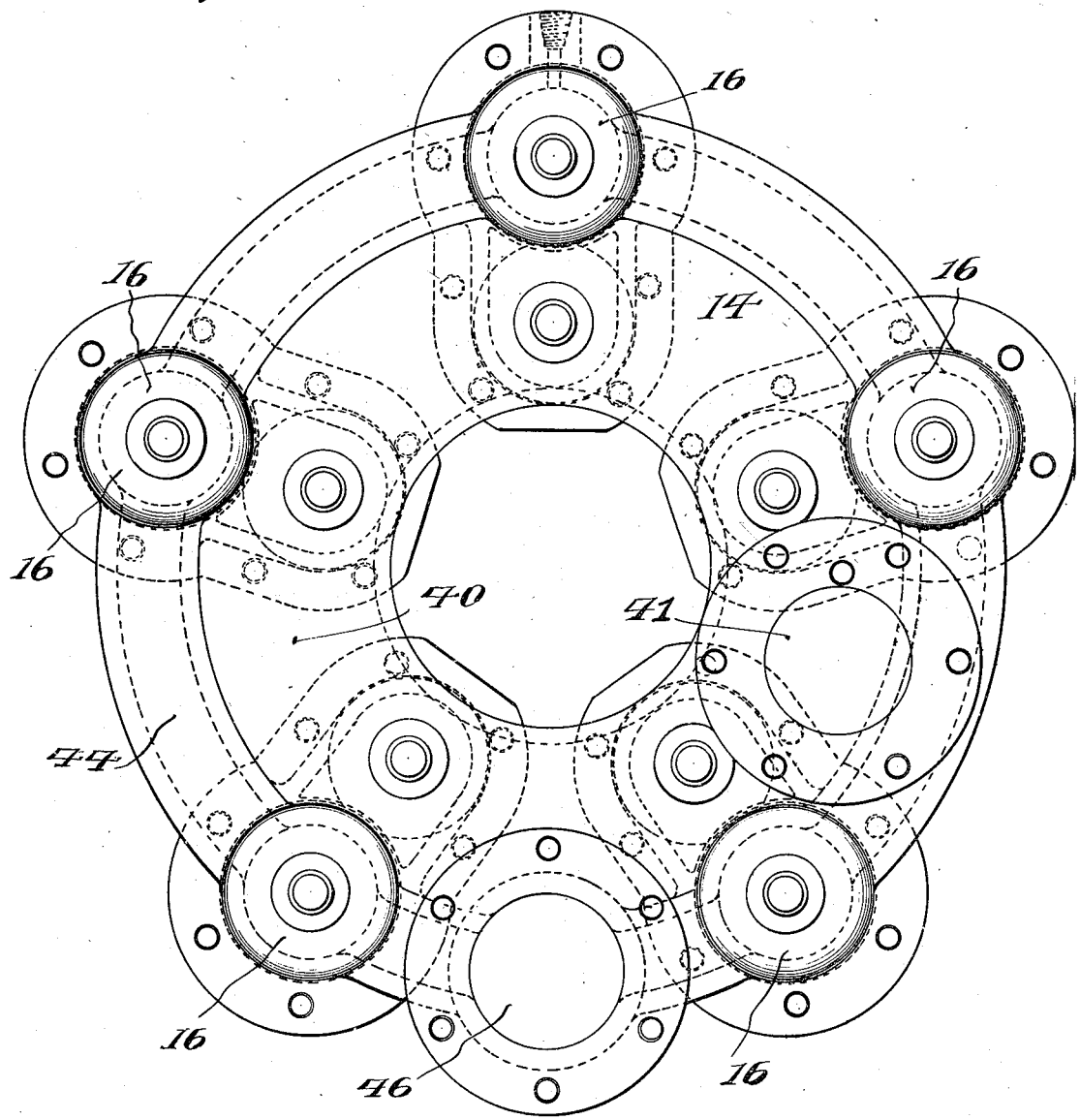

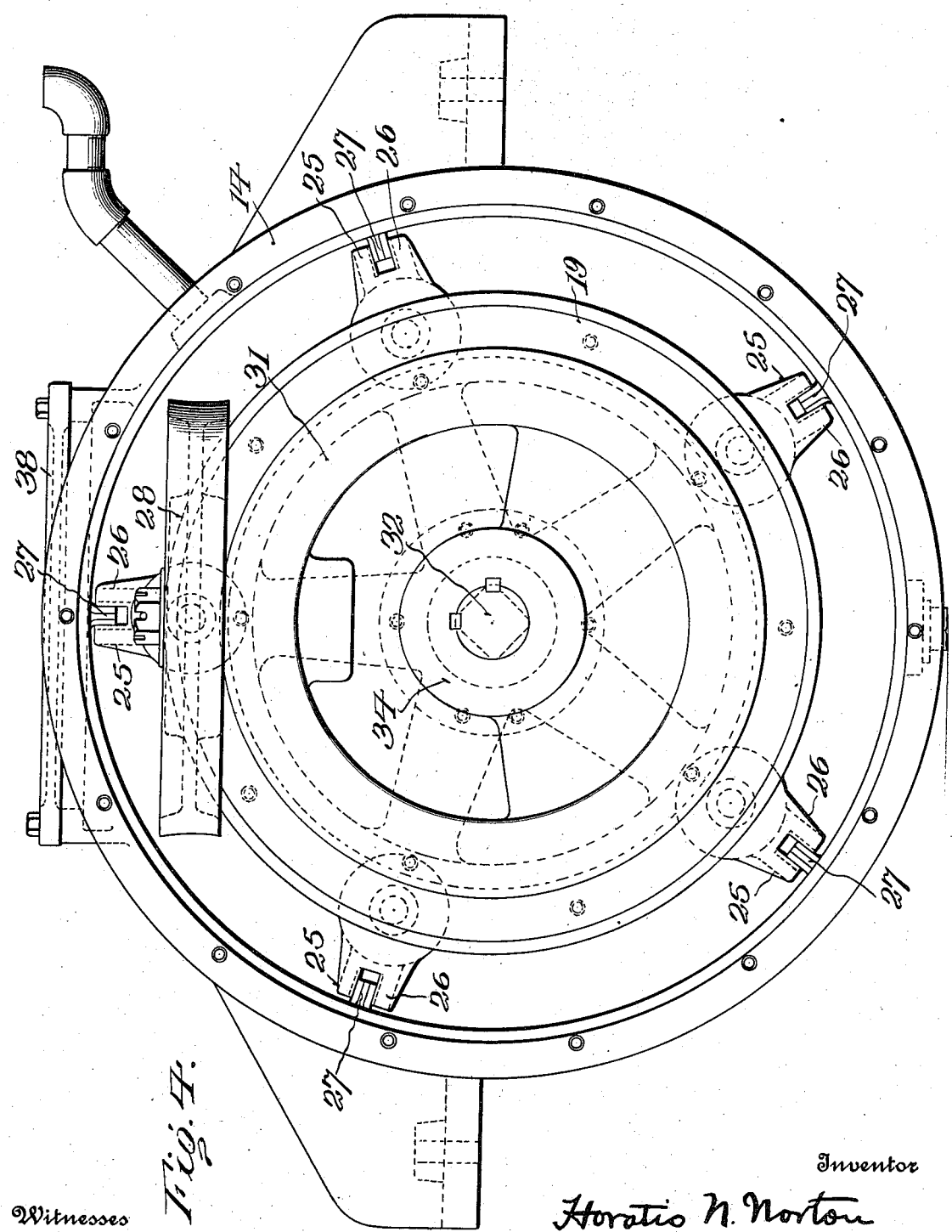

H. N. NORTON.
FLUID POWER TRANSMITTING APPARATUS FOR VEHICLES.
APPLICATION FILED OCT. 28, 1913.
1,157,415.
Patented Oct. 19, 1915.
5 SHEETS—SHEET 5.
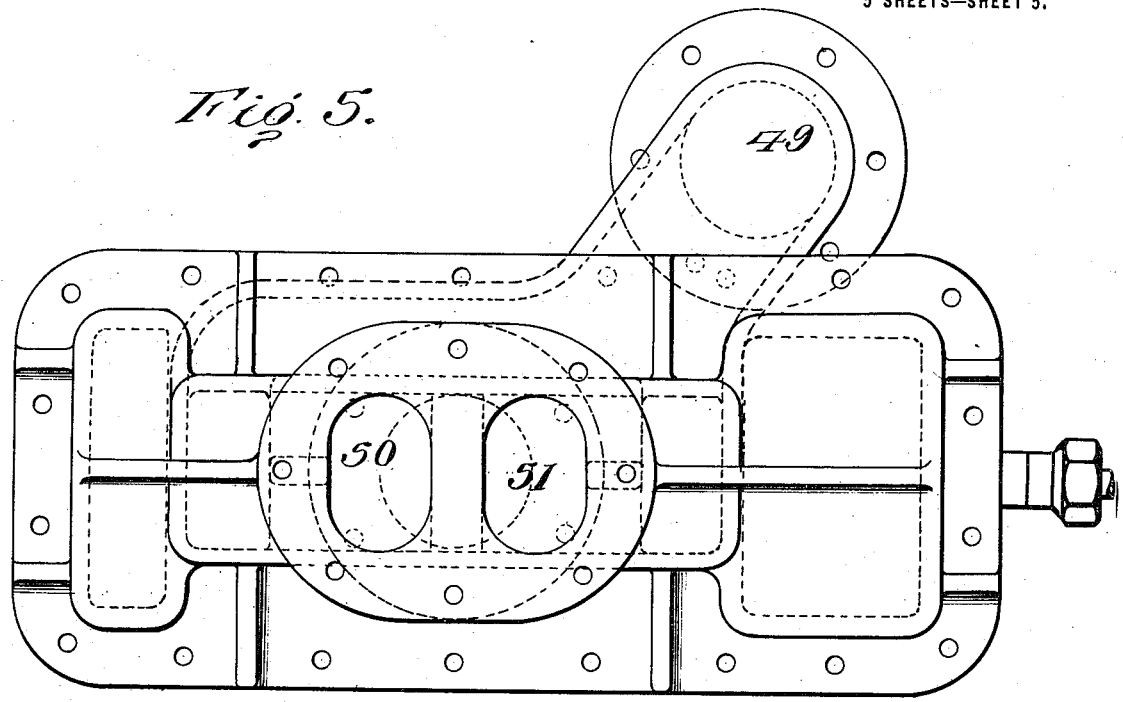
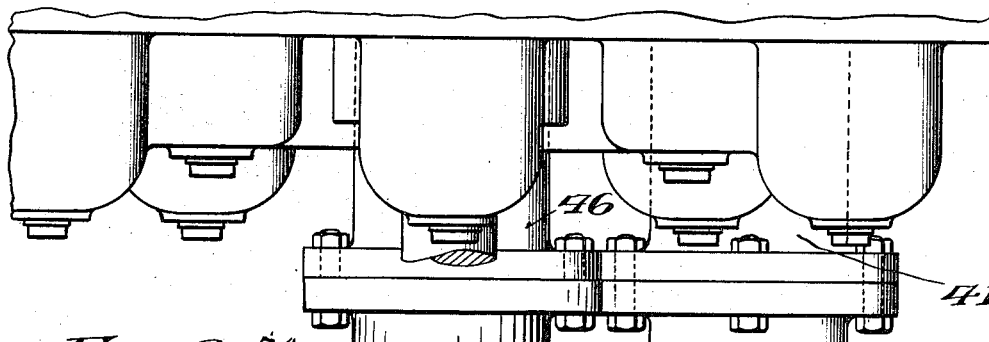
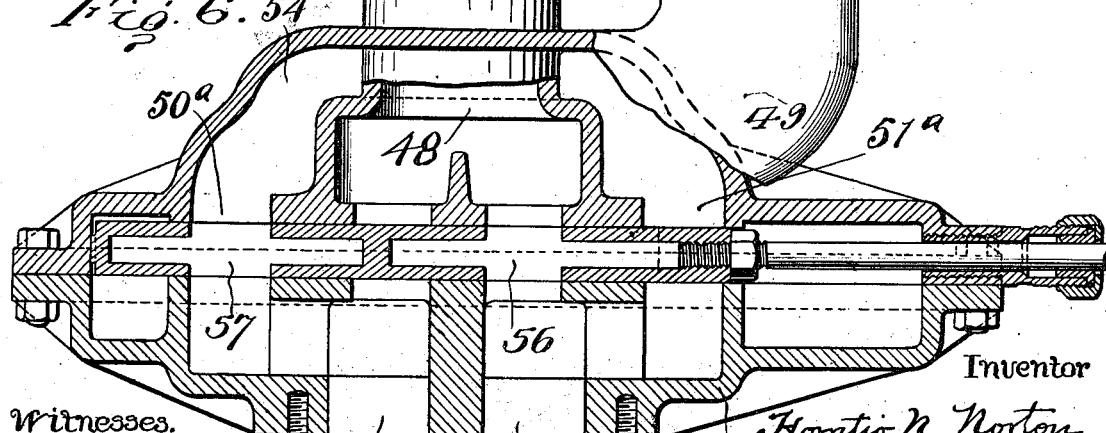

UNITED STATES PATENT OFFICE.

HORATIO N. NORTON, OF MOUNT VERNON, NEW YORK.

FLUID-POWER-TRANSMITTING APPARATUS FOR VEHICLES.

1,157,415. Specification of Letters Patent. Patented Oct. 19, 1915.

Application filed October 28, 1913. Serial No. 797,842.

*To all whom it may concern:*

Be it known that I, HORATIO N. NORTON, a citizen of the United States, residing at Mount Vernon, in the county of Westchester, State of New York, have invented certain new and useful Improvements in Fluid-Power-Transmitting Apparatus for Vehicles, of which the following is a description, reference being had to the accompanying drawing and to the figures of reference marked thereon.

The invention relates to new and useful improvements in a fluid transmitting apparatus for motor vehicles, and more particularly to the pumping device for supplying the fluid under pressure to the fluid operated motors and the controlling devices for said pump.

An object of the invention is to provide a pumping device wherein the amount of fluid transmitted may be readily varied without varying the speed of the pump.

A further object of the invention is to provide devices wherein said controlling device for varying the amount of fluid transmitted may be shifted by a manually controlled power operated mechanism.

A still further object of the invention is to provide means whereby the direction of the flow of the fluid from the pump may be changed for changing the direction of rotation of the fluid operated motors.

These and other objects will in part be obvious and will in part be hereinafter more fully disclosed.

In the drawings which show by way of illustration one embodiment of the invention, Figure 1 is a plan view showing more or less diagrammatically a fluid power transmitting apparatus embodying my invention and applied to a motor vehicle; Fig. 2 is an enlarged transverse sectional view through the pump; Fig. 3 is an end view of the delivery side of the pump; Fig. 4 is a view of the opposite end of the pump, with the cover for the casing removed; Fig. 5 is an end view of the reversing valve casing; Fig. 6 is a view partly in section and partly in plan showing the reversing valve, the casing therefor and the connection to the pump.

The invention consists generally in providing a fluid pumping device which is formed with a plurality of cylinders, each of which has a reciprocating piston, and these pistons are moved back and forth by an operating member which has a supporting fulcrum located centrally thereof, and this operating member is actuated by power applied thereto directly in line with the pistons and said power is shifted successively from one piston to another by the rotation of the power applying element. The fulcrum for this power transmitting member is adjustable so as to vary the stroke of the pistons and thereby vary the amount of fluid transmitted. The power applying member and the adjustable fulcrum therefor are so disposed that the adjustment of the stroke of the piston occurs always at the outer end of its stroke, and the inner or delivery end of the stroke of the pistons is fixed.

The fluid transmitted by the motor passes through a reversing valve and suitable pipes to fluid operated motors, one of which is preferably located at each wheel. This reversing valve is so constructed that the flow of the fluid from the pump may be reversed so as to pass in the opposite direction to the fluid motors for reversing the same. The fulcrum which is shifted for varying the amount of fluid transmitted is also actuated by power mechanism which is controlled by the operator. This power mechanism may be rotated for a predetermined length of time at the will of the operator in either direction, and by the rotating of the fulcrum shifting member, the amount of fluid transmitted, and thereby the power transmitted to the fluid motors is varied, although the inner limit of the stroke of the pistons and the speed of the power transmitting element remain constant.

Referring more in detail to the drawings, I have shown in Fig. 1 more or less diagrammatically a vehicle consisting of a frame 1, having a front axle 2 and a rear axle 3. These axles support the wheels 4. At each wheel is a fluid operated motor 5 which may be of any suitable construction. A pipe 6 extends along one side of the frame 1 and is mounted thereon, and this pipe 6 is connected with the motors in the wheels adjacent the pipe by short pipes 7 and is connected to the motors in the other wheels by pipes 8. Along the other side of the frame is a pipe 9, which is connected to the motors in the wheels adjacent said pipe by short pipes 10, and to the motors in the other wheels by pipes 11. These pipes are so connected to the motors that fluid may be delivered to each of the motors through the pipe 6, and said fluid being under pressure will drive the motors in one direction. The fluid may be discharged from the motors into the pipe 9. On the other hand, the fluid may be delivered to each motor through the pipe 9, which will drive the motors in the opposite direction and the discharge from the motors will be received by the pipe 6. I have also shown in Fig. 1 a prime mover 12 which is preferably an engine of the hydro-carbon type, and this engine operates the main shaft for the pump 13. Fluid is delivered by this pump 13 through a reversing valve 14 either to the pipe 6 or the pipe 9, depending upon the way it is desired to drive the motors, and, in turn, to drive the vehicle. The hydro-carbon engine 12 is of the usual type and further description thereof will not be necessary.

*Fluid transmitting pump.*—The fluid transmitting pump 13 consists of an outer casing 15 which has formed integral therewith a plurality of cylinders 16. As herein shown, there are five cylinders. See Fig. 3. In each cylinder there is a piston 17, to which is connected a piston rod 18ª. The piston rods have a pivotal connection with the pistons and the outer end of each piston rod carries a ball 18. These piston rods are actuated for reciprocating the pistons by a piston actuating member 19. This piston actuating member 19, as shown in side elevation in Fig. 4, is in the shape of a wheel or disk and is rotatably fulcrumed on a supporting ball 20. This supporting ball 20 is carried by the inner end of a shaft 21. Said piston actuating member has a socket 22 centrally thereof to receive the ball 20, and a cap 23 holds the member on said ball. Said piston actuating member is also provided with a plurality of sockets 24, one for each ball 18, and these sockets are equally spaced so as to correspond in position with the cylinders.

The piston actuating member 19 is held from rotation by radially projecting spaced arms 25 and 26. These arms are adapted to engage the respective sides of a projecting lug or rib 27 carried by the main casing 14. The fulcrum ball 20 for the piston actuating member 19 is so disposed relative to the power applying member 28 that said piston actuating member 19 normally lies in a plane cutting at an acute angle the longitudinal axis of the main rotating shaft and also the longitudinal axis of the supporting shaft 21 for the fulcrum ball. The power applying member 28 is in the form of a rotating wheel which is mounted on a ball bearing 29 carried by a stud shaft 30, which, in turn, is mounted in a weighted wheel 31 fixed on the engine shaft 32. This engine shaft is mounted in suitable ball bearings in the end plate 33 of the pump, and a thrust bearing 34 is located between the wheel 31 and said end plate 33.

The power applying wheel 28 is mounted for free rotation on its bearing, and said wheel also travels bodily with the supporting wheel 31, on which it is mounted. This wheel constantly presses against a hardened bearing ring 35 which is detachably mounted on the outer face of the power transmitting member 19.

As the shaft 32 rotates, it will be apparent that the wheel 28 rolling around on the hardened ring 35 will continue to press inward on the ring, giving to said ring, in a sense, a gyratory movement. This gyratory movement which is imparted to the power transmitting member 19 will reciprocate the pistons in the various cylinders. In Fig. 2 the piston shown in section is at the inner end of its stroke, while the piston shown in dotted lines is substantially at the outer end of its stroke. It will be apparent that if the fulcrum ball 20 be shifted to the left, as viewed in Fig. 2, the amount of dip or tilting of the power transmitting member 19 will be less, while, if it be shifted in the opposite direction, said amount of dip or tilting will be greater. It will also be apparent that the piston, when it is forced to the inner end of its stroke for transmitting fluid, has the power applied thereto substantially in line with the piston. In other words, as shown in Fig. 2, the power applying wheel 28 is substantially in line with the ball 18 and the piston rod when the piston is at the inner end of its stroke. Furthermore, this forcing of the power transmitting member 19 in a direction for moving the piston to the inner end of its stroke causes the pistons at the opposite side of the cylinder to be moved outward to the outer end of their stroke. The shifting of the shaft 21, therefore, varies the outer limit of the stroke of the piston and not the inner limit of the stroke, and the inner limit of the stroke of the piston is always constant. In other words, if the ball 20 be shifted to the left, as viewed in Fig. 2, the power applying wheel 28 will move the piston shown in section to exactly the same position on the inner end of its stroke, but the dip or tilt given to the power transmitting member 19 would now be less, and, therefore, the outer limit of the stroke of the pistons would be shifted.

The shaft 21 is provided with a thread 36, and this thread engages an internal threaded sleeve 37, which is fixed to the pump casing. The rotation of the shaft 21 in one direction, therefore, will shift the same longitudinally and vary the position of the fulcrum ball 20, while a rotation of the shaft in the reverse direction will shift the ball in the opposite direction. This shaft 21 is manually controlled.

As above noted, the power transmitting member 19 is held from rotation by the spaced arms 25 and 26, which coöperate with the lug or rib 27. These arms 25 and 26 are spaced about the power transmitting member 19 so as to correspond with the piston rods, as shown in Fig. 4, and while said arms 25 and 26 are at times out of engagement with the lug or rib 27, nevertheless, some one of the pairs of arms 25 and 26 is always in engagement with its coöperating lug or rib 27.

The casing 14 is preferably a closed casing, and access may be had thereto through a cover plate 38, so that this casing may be filled with oil and the operating parts will, therefore be immersed in oil. The oil may be drained from the casing through a suitable opening, closed by a threaded plug 39. Oil is delivered to the cylinders in succession from a chamber 40, which extends about the casing and is connected with an intake opening 41; see Fig. 3. The oil from the chamber 40 passes through a port 42, which leads to the piston. A valve 43 prevents the return of the oil from the port 42 to the chamber 40. The oil is delivered by the return stroke of the piston to a chamber 44 and a valve 45 prevents the return of the oil from the chamber 44 to the cylinder. The chamber 44 extends about the casing and connects all the cylinders with the delivering port 46.

While I have referred to oil as the fluid operated upon by the pump, it will be understood that other fluid may be used.

*Reversing valve.*—The reversing valve is mounted in a casing 47. This casing has a receiving port 48 which is formed as an extension of the delivering port 46. It also has a return port 49, which is formed as an extension of the receiving port 41 for the pump. The valve casing has two ports 50 and 51. One of these ports connects with a pipe 52 and the other with a pipe 53, the pipe 52 being connected in turn to the pipe 6, and the pipe 53 being connected, in turn, to the pipe 9. The port 49 connects with the chamber 54, which extends to the opposite sides of the ports 50 and 51, and is connected with each port. The ports 50 and 51 are directly in line with the port 48 through which the fluid is received from the pump. A valve 55 reciprocates in the valve casing and this valve is manually shiftable. Said valve has openings 56 and 57 therethrough. When the valve is positioned as shown in Fig. 6, the opening 56 is so disposed as to form a connecting passage between the port 48 and the port 51. The chamber 54 is connected to the port 50 through a passage or port 50ª which is also controlled by the slide valve 55 and, therefore, when the valve is positioned as shown in Fig. 6 the port 50 is connected through the opening 57 in the valve and the port 50ª with the chamber 54. In this position the fluid from the pump will pass through the port 48, the opening 56, the port 51, the pipe 52, and the pipe 6 to the fluid motors and would return through the pipe 9 to the port 50, thence through the opening 57 and the port 50ª to the chamber 54, and through the port 49 to the pump. The chamber 54 is likewise connected with the port 51 through an opening or port 51ª which is controlled by the valve 55. If the valve is shifted in the opposite direction, so as to bring the opening 57 into line with the port 48 and the port 50 and the opening 56 into line with the portion 51ª, then the fluid will pass through the opening 57 and out through the port 50, through the pipe 9 to the motors and operate the motors in the reverse direction, and the fluid will return through the pipe 6 to the port 51, thence through the opening 56 and the port 51ª to the chamber 54 and the port 49 in the pump. When the valve is in the position shown in Fig. 6 the valve closes the port 51ª and prevents the fluid from by-passing into the chamber 54, while when the valve is shifted then the other end of the valve will close the port 50ª and prevent the fluid from by-passing from the port 50 back through the port 50ª to the chamber 54. This valve, of course, is provided with operating mechanism which is readily accessible to the operator, and by the shifting of the valve the flow of fluid from the pump to the motors will be reversed without changing in any way the action of the pump.

*Fluid transmitted controlling device.*—As above noted, when the shaft 21 is shifted in one direction or the other, the amount of fluid transmitted is varied without changing the speed of the pump, or the stroke of the pistons of the pump. As a means for shifting the shaft mechanically and yet controlling said shaft by the operator, I have provided a shaft 58 which is connected by a sprocket chain 59 to a suitable sprocket wheel on the main shaft of the engine, and thereby this shaft 58 is continuously rotated. A shaft 60 is mounted in suitable bearings in alinement with the shaft 58. This shaft 60 is connected by a sprocket chain 61 with a sprocket wheel on the shaft 21. The shaft 60 carries a beveled friction gear 62 and the shaft 58 carries a similar beveled friction gear 63. A short shaft 64 is provided with spaced beveled friction gears 65 and 66. When the shaft 64 is moved in one direction, the friction gear 65 will be brought into driving contact with the two friction gears 62 and 63, and power will be transmitted from the shaft 58 to the shaft 60, and the rotation of the shaft 60 will cause the shaft 21 to rotate through the sprocket chain connection 61 and thereby shift the position of the fulcrum ball 20, and vary the effective stroke of the pistons. A shifting of the shaft 64 in the opposite direction will bring the friction gear 66 into action, and cause the shaft 60 to be rotated in the opposite direction, which will in turn, shift the fulcrum ball 20 in the opposite direction.

When the shaft 64 is in an intermediate position, neither friction gear is in action and, therefore, the shaft 21 will remain stationary. The shaft 64 is moved endwise by suitable mechanism accessible to the operator.

*Operation of apparatus.*—It is thought that the operation of the apparatus will be apparent from the above detailed description. A certain amount of operating fluid, preferably oil, is placed in the system. The gas engine is operated in the usual manner and as the engine rotates, the shaft 32 will cause the power applying wheel 28 to reciprocate the pistons in the cylinders in succession one after another. The oil will be drawn into the cylinder through the intake passages 42 controlled by the valves 43, and will be delivered by an instroke of the pistons to the chamber 44 controlled by the valves 45. The oil delivered under pressure to the chamber 44 may be led either to the pipe 6 or the pipe 9, depending upon the position of the reversing valve 55, which is under the control of the operator. If delivered to the pipe 6, it will pass to each motor and propel the motors in a certain direction, after which the fluid will be delivered to and pass back through the pipe 9 to the receiving chamber 40 and thence to the pump. This receiving chamber 40 is of sufficient capacity to provide for the varying amounts of fluid transmitted.

If it is desired to vary the speed transmitted from the engine, without varying the speed of the engine, the operator shifts the shaft 64 in the direction desired, which causes the shaft 21 to be turned in one direction or the other, and thus vary the outer stroke of the pistons and the amount of fluid transmitted.

It will be understood that many of the parts of the apparatus which have been described in detail may be varied without departing from the spirit of the invention, as set forth in the appended claims. It will also be obvious that my improved pumping device may be used for other purposes.

Having thus described my invention, what I claim is:

1. A power transmitting apparatus including a prime mover, a fluid operated motor, and means operated by the prime mover for transmitting fluid under pressure to said motor, including a cylinder, a reciprocating piston for said cylinder, and means whereby the outer limit of the stroke of the piston may be varied without varying the inner limit of the stroke thereof for varying the amount of fluid transmitted.

2. A power transmitting apparatus including a prime mover, a fluid operated motor, and means operated by the prime mover for transmitting fluid under pressure to said motor, including a cylinder, a reciprocating piston for said cylinder, means whereby the outer limit of the stroke of the piston may be varied without varying the inner limit of the stroke thereof for varying the amount of fluid transmitted, and means whereby the direction of flow of the fluid to the motor may be changed.

3. A power transmitting apparatus including a prime mover, a fluid operated motor, means operated by the prime mover for transmitting fluid under pressure to said motor, said means including a plurality of cylinders, a piston for each cylinder, devices for reciprocating the pistons, and means for varying the outer limit of the stroke of each piston without varying the inner limit of the stroke thereof for varying the amount of fluid transmitted.

4. A power transmitting apparatus including a prime mover, a fluid operated motor, means operated by the prime mover for transmitting fluid under presure to said motor, said means including a plurality of cylinders, a piston for each cylinder, devices for reciprocating the pistons, and means for varying the outer limit of the stroke of each piston without varying the inner limit of the stroke thereof for varying the amount of fluid transmitted, said last named means including power operated devices controlled by the operator.

5. A power transmitting apparatus including a prime mover, a fluid operated motor, means operated by the prime mover for transmitting fluid under pressure to said motor, said means including a plurality of cylinders, a piston for each cylinder, devices for reciprocating the pistons, and means for varying the outer limit of the stroke of each piston without varying the inner limit of the stroke thereof for varying the amount of fluid transmitted, said last named means including a shaft and devices whereby said shaft may be rotated at will by said prime mover.

6. A power transmitting apparatus including a prime mover, a fluid operated motor, means for transmitting fluid under pressure to said motor, said means including a plurality of cylinders, a piston for each cylinder, means common to all the pistons for reciprocating the same, means for shifting said actuating means for the pistons, whereby the outer limit of the stroke of the pistons may be varied without varying the inner limit of the stroke thereof.

7. A pump, comprising a plurality of cylinders, a piston for each cylinder, means for reciprocating said pistons, a valve controlled discharge chamber common to each of said cylinders, a valve controlled receiving chamber common to each of said cylinders, and means whereby the outer limit of the stroke of the pistons may be varied for varying the amount of fluid transmitted without varying the inner limit of the stroke thereof.

8. A pump, comprising a plurality of cylinders, a piston for each cylinder, means for reciprocating said pistons, a valve controlled discharge chamber common to each of said cylinders, a valve controlled receiving chamber common to each of said cylinders, and means whereby the outer limit of the stroke of the pistons may be varied for varying the amount of fluid transmitted without varying the inner limit of the stroke of said piston, said last named means including manually controlled power operated devices.

9. A pump, comprising a plurality of cylinders, a piston in each cylinder, a piston rod connected to each piston, a power transmitting member connected with each of the piston rods, a power applying member operating continuously upon said power transmitting member for successively actuating said pistons, a shaft on which said power transmitting member is centrally fulcrumed, and means for adjusting said shaft longitudinally for varying the stroke of the pistons.

10. A pump, comprising a plurality of cylinders, a piston in each cylinder, a piston rod for each piston, a power transmitting member having a universal connection with each piston rod, a longitudinally adjusted shaft having a universal fulcrum connection with said transmitting member centrally thereof, a rotating shaft, a member carried by said rotating shaft and bearing against said power transmitting member for applying power thereto.

11. A pump, comprising a plurality of cylinders, a piston in each cylinder, a piston rod for each piston, a power transmitting member having a universal connection with each piston rod, a shaft having a universal fulcrum connection with said transmitting member centrally thereof, a rotating shaft, a member carried by said rotating shaft and bearing against said power transmitting member for applying power thereto, and means for adjusting the shaft on which said power transmitting member is fulcrumed longitudinally for varying the stroke of the pistons.

12. A power transmitting device comprising a plurality of cylinders, a piston in each cylinder, a piston rod for each piston, a power transmitting member having a universal connection with each piston rod, a shaft having a universal fulcrum connection with said transmitting member centrally thereof, a rotating shaft, a member carried by said rotating shaft and bearing against said power transmitting member for applying power thereto, means for adjusting the shaft on which said power transmitting member is fulcrumed longitudinally for varying the stroke of the pistons, and means for preventing said power transmitting member from rotating.

13. A power transmitting device comprising a casing, having a plurality of cylinders, a valve controlled discharge chamber common to said cylinders, a valve controlled receiving chamber common to said cylinders, a piston in each cylinder, a piston rod connected to each piston, a power transmitting member having a universal connection with each piston rod, a shaft having a universal connection with said power transmitting member centrally thereof, means for adjusting said shaft longitudinally, a hardened bearing ring carried by said power transmitting member, an operating shaft, a wheel mounted on said rotating shaft, and having a stud shaft with its axis at right angles to the axis of said operating shaft, said wheel having a thrust bearing between the same and the casing, a second wheel mounted on said stud shaft and bearing against said hardened ring, the fulcrum for said transmitting member being so disposed relative to the power applying wheel that said transmitting member is given a gyratory movement so as to actuate said pistons in succession for giving the power stroke thereto.

In testimony whereof, I affix my signature, in the presence of two witnesses.

HORATIO N. NORTON.

Witnesses:
 E. G. MASON,
 WILLIAM M. HANSEN.